United States Patent
Zaheer et al.

(10) Patent No.: US 11,798,187 B2
(45) Date of Patent: Oct. 24, 2023

(54) LANE DETECTION AND DISTANCE ESTIMATION USING SINGLE-VIEW GEOMETRY

(71) Applicant: MOTIVE TECHNOLOGIES, INC., San Francisco, CA (US)

(72) Inventors: Aamer Zaheer, Islamabad (PK); Ali Hassan, Islamabad (PK); Ahmed Ali, Islamabad (PK); Hussam Ullah Khan, Islamabad (PK); Afsheen Rafaqat Ali, Islamabad (PK); Syed Wajahat Ali Shah Kazmi, Islamabad (PK)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 357 days.

(21) Appl. No.: 17/173,950

(22) Filed: Feb. 11, 2021

(65) Prior Publication Data
US 2021/0248392 A1    Aug. 12, 2021

Related U.S. Application Data

(60) Provisional application No. 62/975,360, filed on Feb. 12, 2020.

(51) Int. Cl.
*G06K 9/00* (2022.01)
*G06T 7/62* (2017.01)
(Continued)

(52) U.S. Cl.
CPC ............... *G06T 7/62* (2017.01); *G06N 3/04* (2013.01); *G06N 3/08* (2013.01); *G06V 10/454* (2022.01);
(Continued)

(58) Field of Classification Search
CPC ............ G06N 3/04; G06N 3/08; G06N 3/045; G06N 7/01; G06V 10/454; G06V 10/764;
(Continued)

(56) References Cited

U.S. PATENT DOCUMENTS

| 2010/0014714 A1* | 1/2010 | Zhang | G06V 20/588 |
|---|---|---|---|
| | | | 701/28 |
| 2016/0180531 A1 | 6/2016 | Lessmann et al. | |

(Continued)

OTHER PUBLICATIONS

Seo et al., "Use of a Monocular Camera to Analyze a Ground Vehicle's Lateral Movements for Reliable Autonomous City Driving," In: IROS'13 5th Workshop on Planning, Perception and Navigation for Intelligent Vehicles (PPNIV '13), pp. 197-203 (2013).
(Continued)

*Primary Examiner* — Dhaval V Patel
(74) *Attorney, Agent, or Firm* — George David Zalepa; Greenberg Traurig, LLP

(57) ABSTRACT

Disclosed are methods, devices, and computer-readable media for detecting lanes and objects in image frames of a monocular camera. In one embodiment, a method is disclosed comprising receiving a sample set of image frames; detecting a plurality of markers in the sample set of image frames using a convolutional neural network (CNN); fitting lines based on the plurality of markers; detecting a plurality of vanishing points based on the lines; identifying a best fitting horizon for the sample set of image frames via a RANSAC algorithm; computing an inverse perspective mapping (IPM) based on the best fitting horizon; and computing a lane width estimate based on the sample set of image frames using the IPM in a rectified view and the parallel line fitting.

20 Claims, 12 Drawing Sheets

(51) Int. Cl.
*G06N 3/04* (2023.01)
*G06N 3/08* (2023.01)
*G06V 20/56* (2022.01)
*G06V 10/764* (2022.01)
*G06V 10/82* (2022.01)
*G06V 10/44* (2022.01)

(52) U.S. Cl.
CPC ............ *G06V 10/764* (2022.01); *G06V 10/82* (2022.01); *G06V 20/588* (2022.01); *G06T 2207/20084* (2013.01); *G06T 2207/30204* (2013.01); *G06T 2207/30256* (2013.01)

(58) Field of Classification Search
CPC .................. G06V 10/82; G06V 20/588; G06T 2207/20084; G06T 2207/30204; G06T 2207/30256; G06T 2207/10016; G06T 2207/20081; G06F 18/2413
See application file for complete search history.

(56) References Cited

U.S. PATENT DOCUMENTS

| | | | |
|---|---|---|---|
| 2016/0379064 A1* | 12/2016 | van Beek | G06V 10/56 |
| | | | 382/104 |
| 2018/0129887 A1 | 5/2018 | Kang et al. | |
| 2018/0189577 A1* | 7/2018 | Yoo | G06T 7/593 |
| 2018/0225527 A1* | 8/2018 | He | G06V 10/82 |
| 2019/0034740 A1 | 1/2019 | Kwant et al. | |
| 2019/0266418 A1* | 8/2019 | Xu | G06V 10/457 |

OTHER PUBLICATIONS

International Search Report and Written Opinion to corresponding International Application No. PCT/US21/17893 dated May 3, 2021 (8 pages).

* cited by examiner

LANE DETECTION AND DISTANCE ESTIMATION USING SINGLE-VIEW GEOMETRY

CROSS-REFERENCE TO RELATED APPLICATIONS

This application claims the benefit of priority of Provisional Pat. Appl. No. 62/975,360 filed on Feb. 12, 2020, which is hereby incorporated by reference in its entirety.

BACKGROUND

The disclosed embodiments relate to automotive systems and to machine learning systems for analyzing sensor data in such systems.

Multiple cameras or sensors may be installed in a vehicle to detect objects. However, the use of multiple cameras may be expensive. Sensors such as Radar and Lidar may also be used as proximity sensors but such sensors may also be costly. In addition, a built-in monocular camera may be used to detect the relative distance to proximate objects, however this may require the location of the camera to be predefined or preset.

BRIEF SUMMARY

The present disclosure relates to using a monocular camera (e.g., an image sensor) that may be retrofitted and adjustable within the vehicle such as, the vehicle's dashboard. Upon driving, the camera initializes and determines its height with respect to the ground. Thus, the camera may be installed at various heights and later re-initialized. The height estimation is determined based on performing lane boundary calculations and using known or standardized lane widths. In this respect, single view geometry is applied which exploits geometric features of the road for distance estimation.

Embodiments are directed to using cross-ratios of lane boundaries to estimate horizon. Embodiments are directed to determining an Inverse Perspective Mapping (IPM) and camera height from known lane width and a detected horizon. Distances of the vehicles on the road may be calculated by back projecting image point to a ray and intersecting that ray with the reconstructed road plane.

The present disclosure is directed to an efficient and reliable distance estimation framework that is not known to be present in ADAS (Advanced Driver Assistance Systems) literature. For example, monocular cameras (e.g., a dashboard camera) may estimate distances to vehicles in real-time without the use of expensive sensor systems (e.g., Radar, Lidar) and without continuous use of resource intensive technologies like artificial intelligence and deep learning algorithms.

Embodiments of the present disclosure relate using simple dashcam images as input followed by an algorithm that calculates distance in real-time. For example, the images may include dashcam color (RGB) images. The camera may be installed inside the driver's cabin, near the roof, looking forward onto the road (also referred to as a road-facing camera). As soon as the images are acquired, the algorithm processes and finds the distance with respect to vehicle(s) in view.

In some embodiments, a first part of the algorithm comprises a lane line detection procedure. In some embodiments, deep learning-based lane line detection algorithms are executed upon initialization and are not executed after initialization. During initialization, the lane lines (lane boundaries) are detected and then using a geometric relationship of the lane lines (parallelism), the horizon and thereby a transformation is estimated which can remove perspective distortion from images (finding an Inverse Perspective Mapping).

In some embodiments, horizons may also be estimated by using a Deep Learning (DL) system to detect horizon points (also referred to as vanishing points). In some embodiments, such a DL-based technique may be implemented as part of a lane key point detector network. In other embodiments, the DL-based technique may be implemented as a separate DL-based horizon key point detector.

Predefined real-world lane width may then be used to find the camera height. The estimation of camera height completes the initialization phase. Camera initialization holds as long as the camera is not displaced from its position which is less likely since it is held in place in a rigid assembly. Thus, the initialization phase estimates camera height in the field while the vehicle is moving on a road with visible lane lines. The camera height may be stored for subsequent operations. In some embodiments, initialization may occur within less than a minute.

Once initialized, distance of the lead vehicles can be estimated in real-time, or near real-time, on any onboard device or via a remote computing environment (e.g., a cloud platform) using various arithmetic calculations.

DETAILED DESCRIPTION

Figure 1:
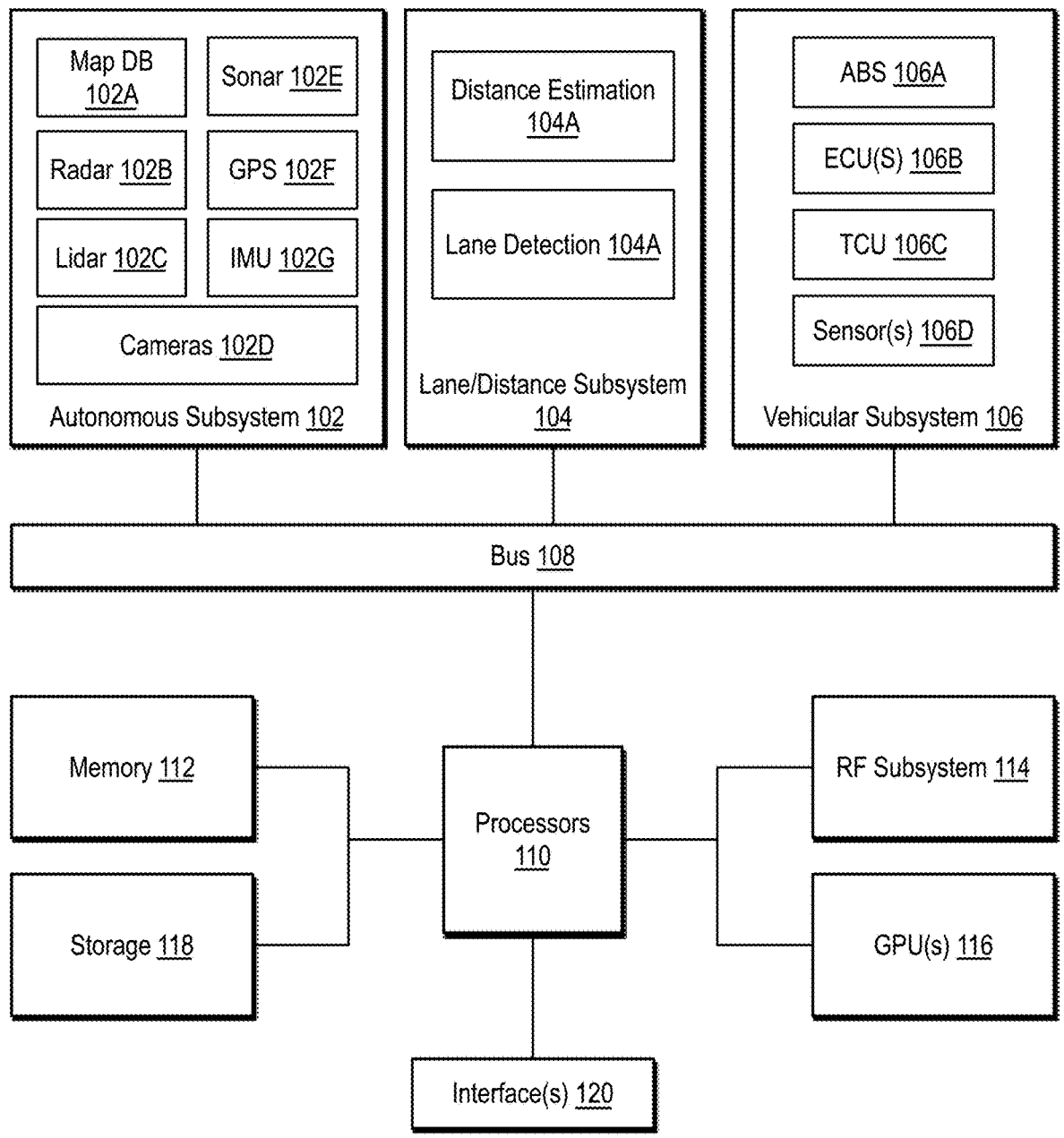
FIG. 1 is a block diagram of a vehicle according to some embodiments of the disclosure.

FIG. 1 is a block diagram of a vehicle according to some embodiments of the disclosure.

The system illustrated in FIG. 1 may be installed entirely within a vehicle. In some embodiments, some components (e.g., components and subsystems other than subsystem, 104) may comprise existing autonomous vehicle subsystems, although in some embodiments autonomous vehicle subsystems are optional. Thus, the vehicle in FIG. 1 may comprise either an autonomous, semi-autonomous, or non-autonomous vehicle. Descriptions made herein are primarily described with respect to autonomous vehicles however this is not intended to be limiting.

In the illustrated embodiment, the system includes an autonomous vehicle subsystem (102) or Advanced Driver Assistance System (ADAS). In the illustrated embodiment, autonomous vehicle subsystem (102) includes map database (102A), radar devices (102B), Lidar devices (102C), digital cameras (102D), sonar devices (102E), global positioning system (GPS) receivers (102F), and inertial measurement unit (IMU) devices (102G). Each of the components of autonomous vehicle subsystem (102) comprise standard components provided in most current autonomous vehicles or ADAS. In one embodiment, map database (102A) stores a plurality of high-definition three-dimensional maps used for routing and navigation. Radar devices (102B), Lidar devices (102C), digital cameras (102D), sonar devices (102E), GPS receivers (102F), and inertial measurement units (102G) may comprise various respective devices installed at various positions throughout the autonomous vehicle as known in the art. For example, these devices may be installed along the perimeter of an autonomous vehicle to provide location awareness, collision avoidance, and other standard autonomous vehicle or ADAS functionality. As discussed, in some embodiments, the autonomous vehicle subsystem (102) may be optional or limited such as any form of an ADAS. For example, a non-autonomous vehicle may only include one camera device such as a dash-mounted camera device. In this embodiment, the camera may be included in the sensors (106D).

Vehicular subsystem (106) is additionally included within the system. Vehicular subsystem (106) includes various anti-lock braking system (ABS) devices (106A), engine control unit (ECU) devices (106B), transmission control unit (TCU) devices (106C), and various other sensors (106D) such as heat/humidity sensors, emissions sensors, etc. These components may be utilized to control the operation of the vehicle. In some embodiments, these components perform operations in response to the streaming data generated by autonomous vehicle subsystem (102). The standard autonomous vehicle interactions between autonomous vehicle subsystem (102) and vehicular subsystem (106) are generally known in the art and are not described in detail herein.

The processing side of the system includes one or more processors (110), short-term memory (112), a radio-frequency (RF) system (114), graphics processing units (GPUs) (116), long-term storage (118) and one or more interfaces (120).

One or more processors (110) may comprise central processing units, field-programmable gate arrays (FPGAs), or any range of processing devices needed to support the operations of the autonomous vehicle. Memory (112) comprises dynamic random-access memory (DRAM) or other suitable volatile memory for temporary storage of data required by processors (110). RF system (114) may comprise a cellular transceiver and/or satellite transceiver. Long-term storage (118) may comprise one or more high-capacity solid-state drives (SSDs). In general, long-term storage (118) may be utilized to store, for example, high-definition maps, routing data, and any other data requiring permanent or semi-permanent storage. GPUs (116) may comprise one or more high throughput GPU, vector processing unit (VPU), tensor processing unit (TPU) devices for processing data received from autonomous vehicle subsystem (102). Finally, interfaces (120) may comprise various display units positioned within the autonomous vehicle (e.g., an in-dash screen).

Each of the devices is connected via a bus (108). In one embodiment, the bus (108) may comprise a controller area network (CAN) bus. In some embodiments, other bus types may be used (e.g., a FlexRay or Media Oriented Systems Transport, MOST, bus). Additionally, each subsystem may include one or more additional busses to handle internal subsystem communications (e.g., Local Interconnect Network, LIN, busses for lower bandwidth communications).

The system additionally includes a lane and distance subsystem (104) which performs the operations required by the methods illustrated in the following Figures. The lane and distance subsystem (104) includes a distance estimation subunit (104A) that can determine distance between the system and other object. The lane and distance subsystem (104) additionally includes a lane detection subunit (104B) that can detect lanes (including unmarked lanes) on a roadway the vehicle is operating on. In some embodiments, the lane and distance subsystem (104) may be an aftermarket device installed in a non-autonomous vehicle system. In other embodiments, the lane and distance subsystem (104) can be integrated into an autonomous vehicle's or ADAS processing units. Details of these subunits (104A, 104B) and their operations are further described herein.

As will be discussed in more detail, some embodiments of the disclosure are related to lane detection in the above vehicular system. The disclosed embodiments generalize lane boundary (line or curve) detection on a rather small dataset as compared to lane region analysis which requires larger data sets. The disclosed embodiments utilize a convolutional neural network to predict lane boundary markers directly instead of sampling them from segmentation maps. The CNN output is then passed through a post-processing pipeline to fit lines to the predicted markers generated by the CNN and initialize lane width and camera rotation using the equidistant and parallelism properties of the road lane lines. At inference, if the disclosed embodiments fit two lane boundaries (e.g., lines or curves) to the detected markers jointly using the initialized lane width within a reasonable tolerance (e.g., 30%) and parallelism, the disclosed embodiments may then predict any missing lane boundaries and handle multiple predictions through weighted averaging. The disclosed embodiments greatly improve the lane detection accuracy when compared to existing systems.

Figure 2:
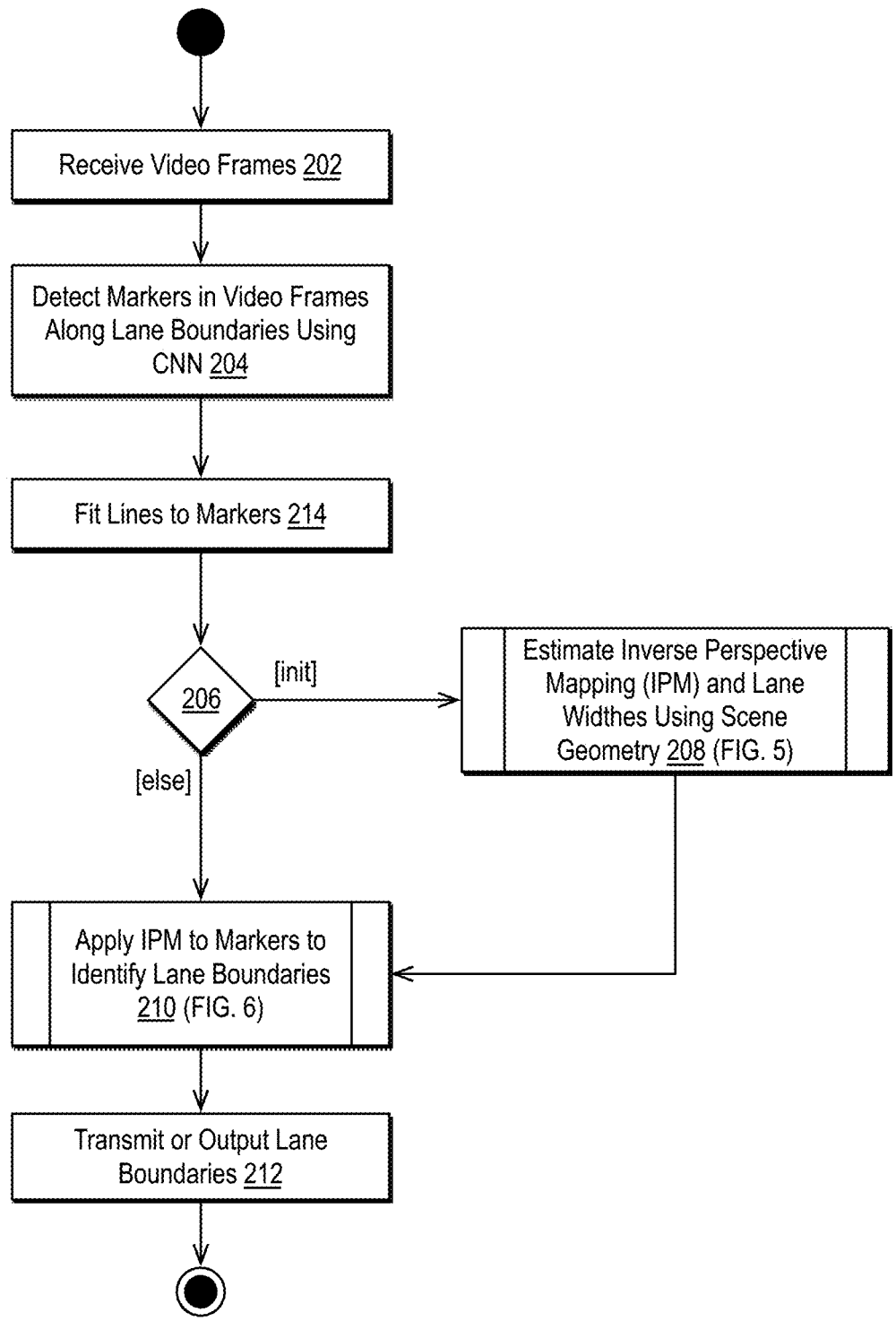
FIG. 2 is a flow diagram illustrating a method for detecting lane markers on a roadway according to some embodiments of the disclosure.

FIG. 2 is a flow diagram illustrating a method for detecting lane markers on a roadway according to some embodiments of the disclosure.

In step 202, the method receives video frames. In one embodiment, the video frames are captured by a camera installed on a vehicle. In one embodiment, the camera is mounted at a fixed location and direction with respect to the vehicle. For example, the camera may be a dash-mounted camera. In the illustrated embodiment, the camera continuously streams video frames while in operation.

In step 204, the method detects markers (or key points) in video frames using a CNN. Next, in step 214, the method fits one or more lines to the markers. Reference is made to FIG.

3 which depicts one embodiment of a CNN according to some embodiments of the disclosure.

Figure 3:
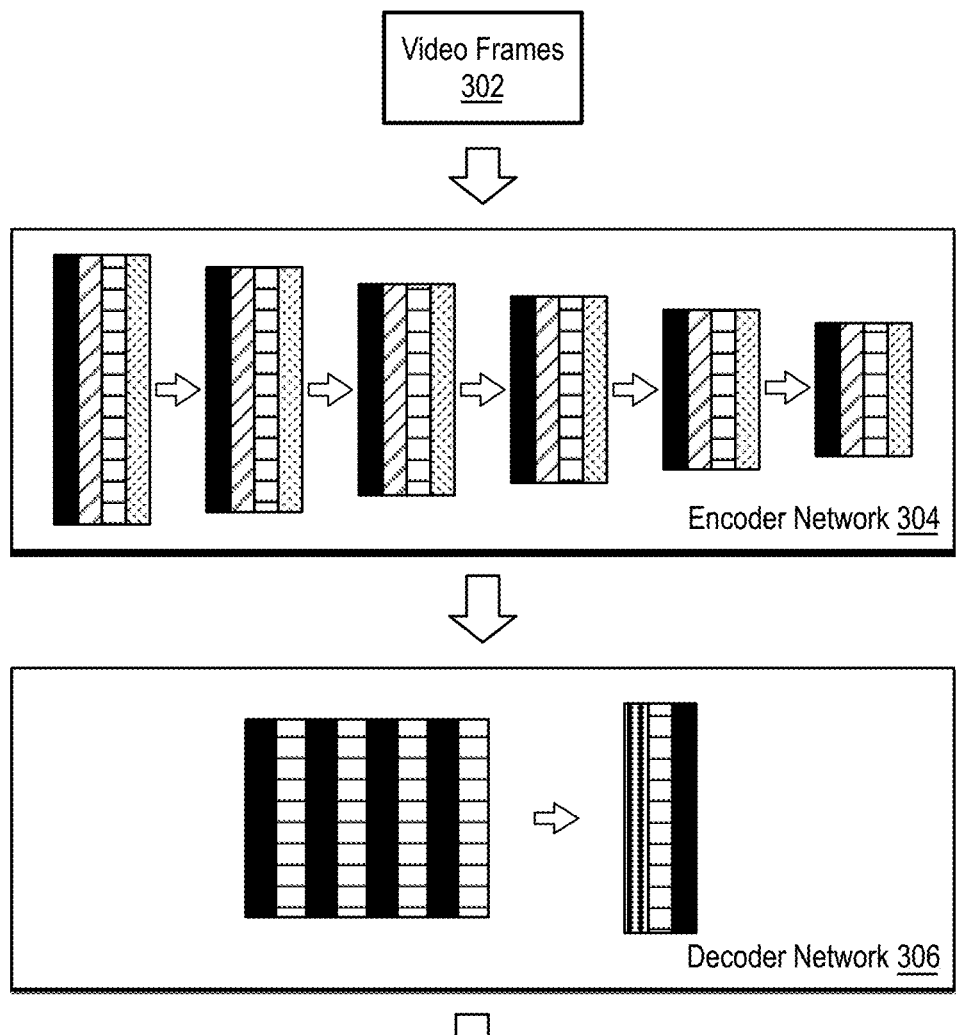
FIG. 3 is a block diagram of a deep convolutional neural network for lane key points or marker detection according to some embodiments of the disclosure.
Figure 3:
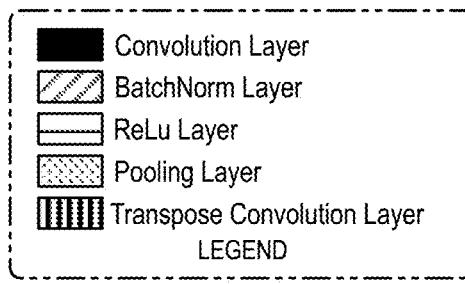

FIG. 3 is a block diagram of a deep convolutional neural network for lane key points or marker detection according to some embodiments of the disclosure.

In the illustrated embodiment, the CNN includes an encoder network (304) and a decoder network (306). Video frames (302), e.g., still images, are input into the CNN and the CNN outputs a lane boundary marker map (308).

In the illustrated embodiment, the method represents each lane boundary using a fixed number of markers. Downstream estimation of a horizon (and, in turn, determining the IPM) is generally dependent upon the correct localization of a vanishing point (VP). Therefore, during training, more markers near the VP may be sampled. Further, points near the VP represent larger distances in the real world, so accurate localization of these points is important for precise line/curve fitting. To sample markers, in some embodiments, the method fits a cubic spline curve on the ground truth points for each lane boundary and then divides it vertically into three equal segments where half (505) of the total markers are sampled from a segment that is closer to the VP and a quarter (25%) of the total markers from the rest of the two segments each.

In the illustrated embodiment, the video frames (302) have input size of 3×H×W, where H is the height of the frame, W is the width of the frame, and the value of three represents the RGB value of each pixel. In the illustrated embodiment, the encoder network (304) encodes all relevant low- and high-level features from the input image (302). In the illustrated embodiment, the encoder network (304) includes six layers. Each of the six layers comprises a convolution layer, BatchNorm layer, ReLu layer, and pooling layer. The number of layers in the encoder network (304) and the specific arrangement of each layer is exemplary only and other arrangements may be used. In some embodiments, a ResNet50 architecture, or variant thereof, may be employed to construct the encoder network. In other embodiments, alternative segmentation networks may be utilized.

In the illustrated embodiment, the decoder network (306) learns the relationship between provided low- and high-level features and makes the decision on top of it. The decoder network (306) includes four layers, each layer comprising a convolution layer and a ReLu layer. The decoder network (306) then includes a transpose convolution layer that upsamples the feature map by a factor of four for precise localization of lane markers. Finally, the decoder network (306) includes a final layer comprising a convolution layer and a ReLu. This final layer generates a one-hot mask for each marker where only the marker's pixel is marked as foreground or one. In the illustrated embodiment, K represents the number of markers per-lane and L represents the number of lanes detected in the frame.

In some embodiments, to avoid inter-class competition among multiple markers, a per-mask cross-entropy loss can be computed. The total loss of this network is the average of the loss for all K markers. At inference time, unique marker in each output map is computed by selecting the one with the highest score.

In step 206, the method determines if the system is initializing a camera. If so, the method proceeds to step 208. If not, the method proceeds to step 210. In one embodiment, the method determines that the system is initializing if an IPM has not previously been stored for the camera. In one embodiment, the estimation of IPM is a one-off calculation for a given camera which is done over a small set of initial frames. Thus, each camera can be associated with an IPM and this IPM need only be calculated once per camera. In some embodiments, the IPM may be recalculated as desired or in response to a change in camera position or other intrinsic value.

In step 208, the method estimates the IPM using scene geometry in the frames recorded by the camera.

In one embodiment, camera initialization involves using camera intrinsic values and road geometry to find an IPM to synthetically rotate the viewpoint of the video frames and lane width to fit equidistant parallel lanes in rectified view after the initialization.

In one embodiment, the methods discussed in connection with FIG. 2 may utilize horizon detection directly from lane detection network as a fifth line (in addition to four lane lines) and find an IPM to synthetically rotate the viewpoint of the video frames and lane width to fit equidistant parallel lanes in rectified view after the initialization. In some embodiments, a separate network for horizon detection may also be used.

In the illustrated embodiment, the estimation of the IPM is performed using a right-handed frame of reference. This geometry is depicted in FIG. 4A.

Figure 4A:
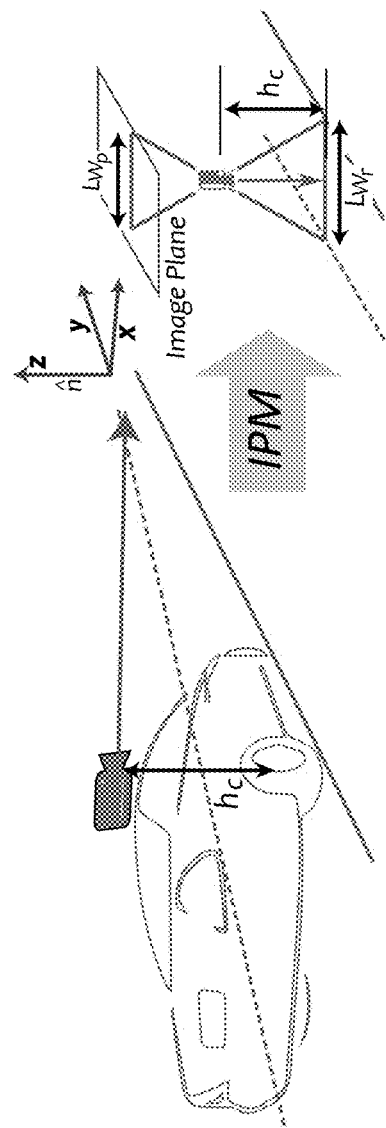
FIGS. 4A and 4B are diagrams of scene geometries of a camera and IPM according to some embodiments of the disclosure.

FIG. 4A is a diagram of a scene geometry of a camera and IPM according to some embodiments of the disclosure.

Figure 5:
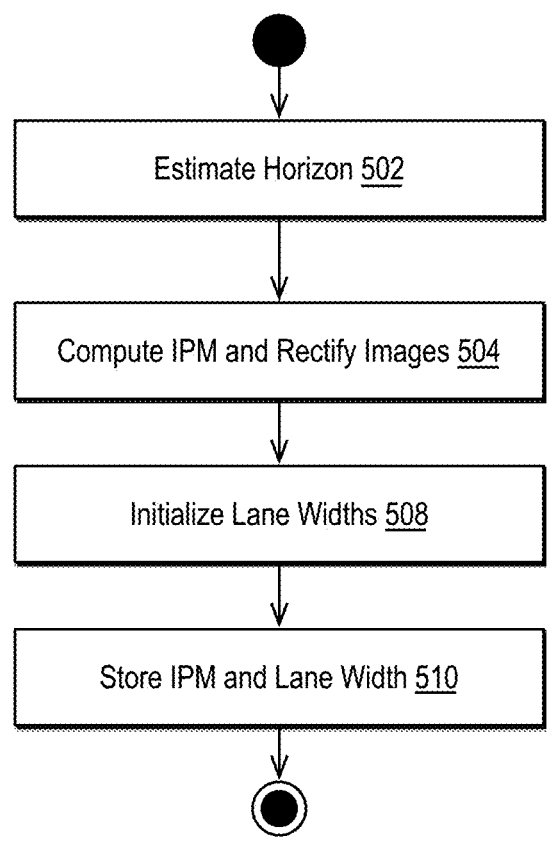
FIG. 5 is a flow diagram illustrating a method for initializing a camera installed in a vehicle according to some embodiments of the disclosure.

The road plane normal is along the Z-axis (upwards), the Y-axis is in the driving direction, and the X-axis towards the right side of the vehicle. As shown in FIG. 4A, the camera generally has tilt with respect to the X-axis, whereas the pan angle with respect to Y-axis is usually negligible and therefore, the image mainly exhibits perspective distortion only. Further details of FIG. 4A are provided throughout the disclosure as needed and are not fully included herein. The IPM is used to remove the perspective distortion in the images captured by a camera. Application of the IPM synthetically rotates the camera into a top (e.g., bird's eye) view thus rendering the intersecting lines as parallel as they appear in the real world. In the illustrated embodiment, the use of IPM improves curve fitting. A DL based network to calculate an IPM may also be used as done in some literature. On the other hand, for a geometric approach, a pre-determined camera pose is challenging as it may vary from time to time. Therefore, the disclosed embodiments provide an accurate and robust way of estimating an IPM without any prior knowledge of the camera pose. Instead, the disclosed embodiments use road geometry to identify the camera pose and in-turn find the IPM. FIG. 5 provides further detail regarding the initialization process.

FIG. 5 is a flow diagram illustrating a method for initializing a camera installed in a vehicle according to some embodiments of the disclosure. As described above, the method in FIG. 5 may only need be performed once per camera or only on demand.

In step 502, the method estimates a horizon based on an input set of video frames.

In the illustrated embodiment, the estimation of IPM assumes a planar road scene having little or no elevation and more than one lane (e.g., three or more lane boundaries), such as a typical highway scenario. In one embodiment, the step of estimating the horizon includes the following substeps. In some embodiments, the method first estimates a horizon before estimating a required camera rotation for an IPM. In general, a horizon is a vanishing line of a plane which, in the context of a vehicle-mounted camera, lies at the union of the road and the sky.

As described, in step 214 (and 814), the method may fit lines to markers detected in the video frames. As discussed above, the markers may be detected by a CNN such as that depicted in FIG. 3 and described therein. Alternatively, any other segmentation network (such as SegNet, UNet, Deep-Lab, etc) may be used for detecting lane boundary markers. In one embodiment, a best fit line includes a minimum number of "inlier" markers (i.e., 25% of total number of markers for each lane boundary). As used herein, inlier markers are those having horizontal distance of under a fixed number (e.g., eight) pixels to the best first-degree line fit through a random sample consensus (RANSAC) algorithm.

After fitting lines, the method initializes an estimation of a vanishing line (i.e., horizon) from these fitted lines. In one embodiment, two sets of vanishing points (VPs) are initialized: forward and lateral VPs. In one embodiment, forward VPs can be found from the cross product of the world parallel lines. For lateral vanishing points, in one embodiment, the method uses cross-ratios of three real-world parallel lines which are the lane lines. Once a set of forward and lateral VPs is found, the method use a horizon estimation algorithm to find the best fitting horizon $l_h$.

Figure 10A:
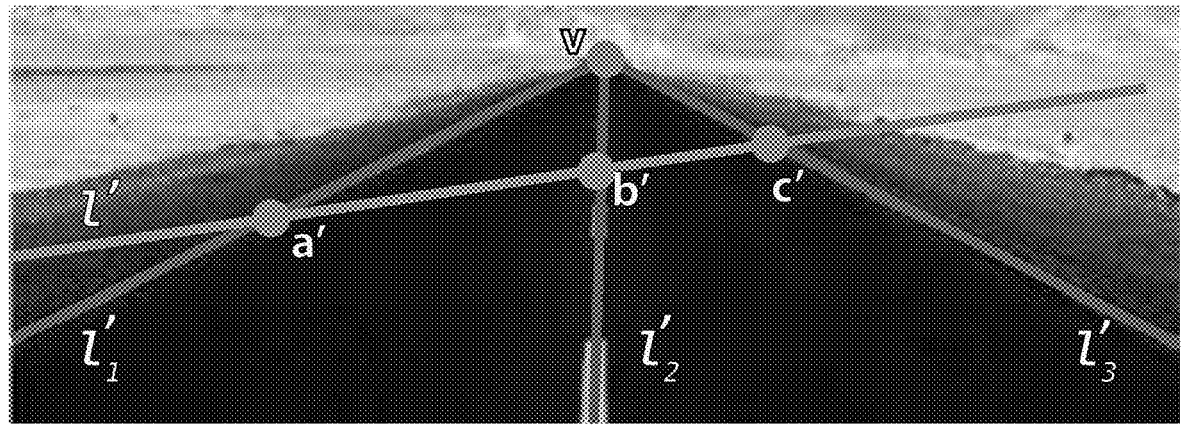
FIGS. 10A and 10B are images of a roadway and horizon captured by a camera according to some embodiments of the disclosure.
Figure 10B:
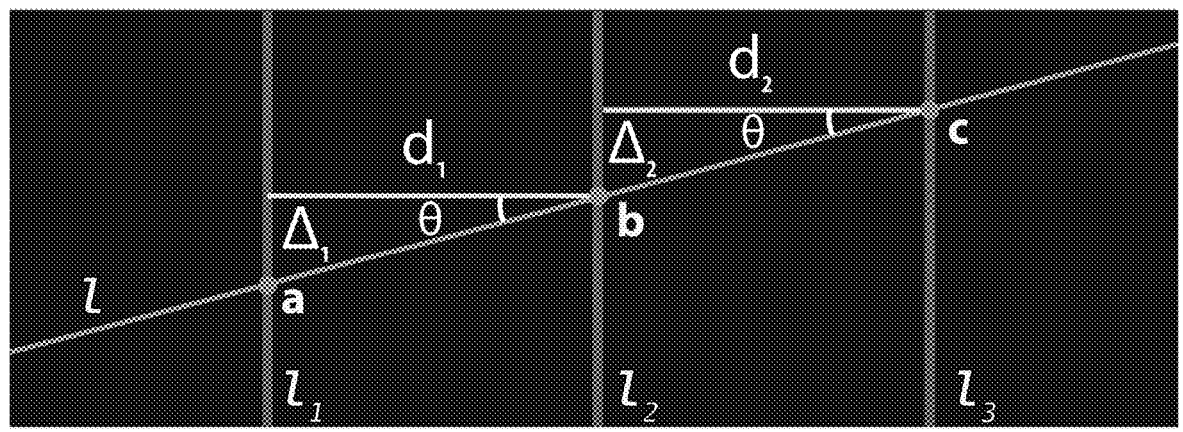

In order to find such a vanishing line, two VPs for each video frame may be first identified. The first, forward VP can be calculated through the cross product of the vectors of any two lane lines expressed in homogeneous coordinates as illustrated in FIGS. 10A and 10B. We call it the forward vanishing point (V).

As illustrated in FIG. 10A, if there are three co-linear points in an image a', b' and c' with known real world length ratios $$\left(\frac{ab}{bc}\right)$$

of their corresponding real world points (a, b and c) as illustrated in FIG. 10B a lateral vanishing point (V') on the vanishing line of the plane on which these points lie can be identified. Then, the method identifies three co-linear points existing on the road plane having known real world length ratios. In some embodiments, since the CNN has detected lane lines in the image which lie on the road plane, the method can identify three co-linear points by drawing any line l' which intersects all three lane lines at points a', b' and c' respectively.

In the embodiments illustrated in FIGS. 10A and 10B, the points a', b' and c' are in fact images of their real world counter parts a, b, and c which lie on a line l as shown in FIG. 10B. The line l' is the image of line l. To find the lateral vanishing point of the road plane, the method determines the length ratios between these real world points. Since these three points lie on three (parallel) lane lines ($l_1$, $l_2$ and $l_3$), the method can determine that the ratio of the line segments $$\left(\frac{ab}{bc}\right)$$

is equal to $d_1/d_2$, where $d_1$ and $d_2$ are the distances between lines $l_1$, $l_2$ and $l_3$, respectively, as shown in FIG. 10B. In the illustrated embodiment, $d_1$ and $d_2$ represent lane widths.

In general, the aforementioned procedure may work optimally when the widths of the lanes (i.e., $d_1$ and $d_2$) are roughly equal and thus $$\frac{d_1}{d_2} \cong 1.$$

Thus, in some embodiments, the method may utilize GPS coordinates to determine when a vehicle is on a roadway having substantially equal lane widths (such as an interstate highway in the United States). Further, in some embodiments, the method may only execute upon determining (based on GPS coordinates and map) that the camera is situated on a significantly straight portion of highway.

After identifying two VPs for each frame, the method may find the best fitted line matching the identified VPs. Details of this procedure are depicted in FIG. 11 and described herein.

Figure 11:
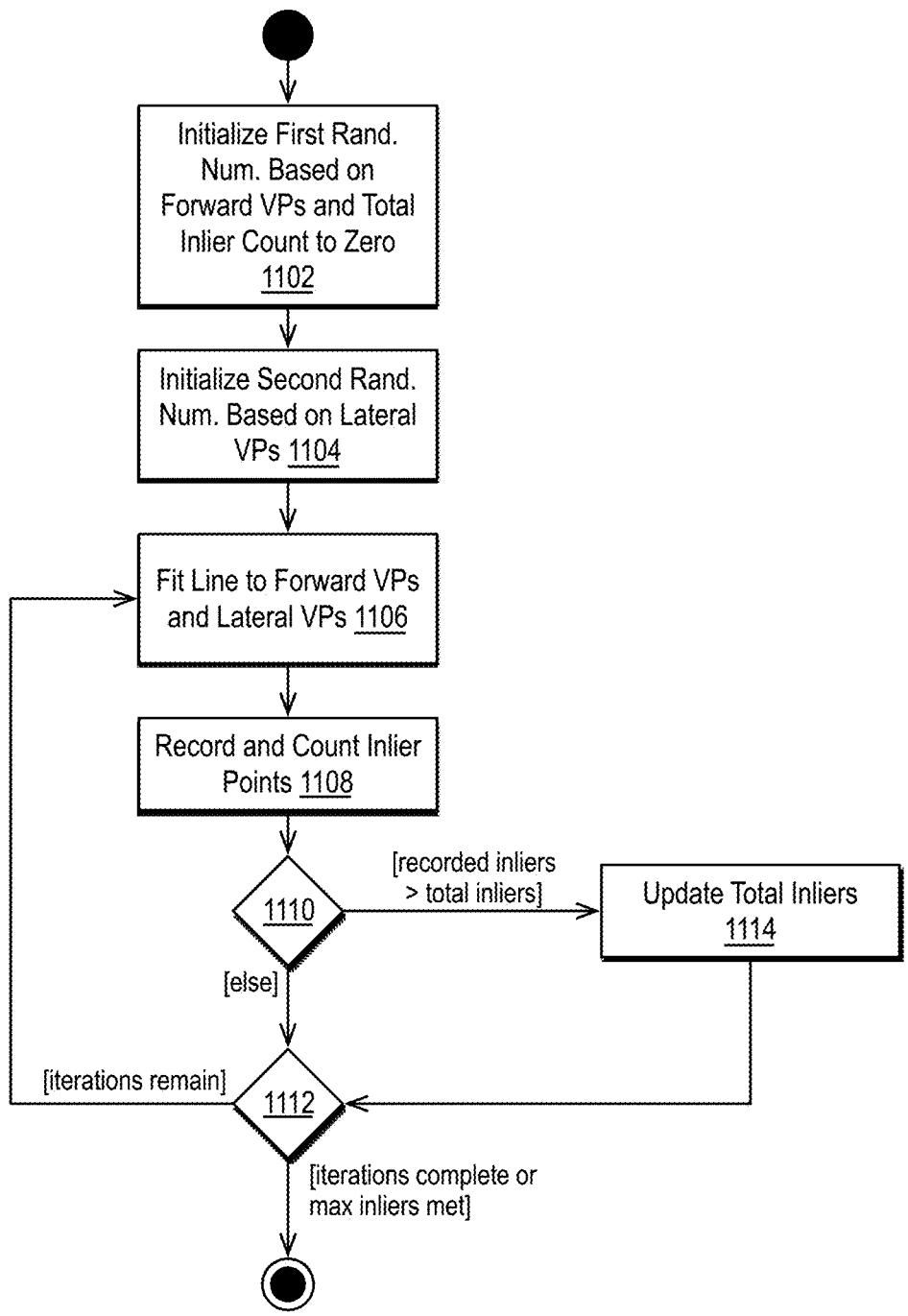
FIG. 11 is a flow diagram illustrating a method for estimating a horizon line in a plurality of video frames according to some embodiments of the disclosure.

FIG. 11 is a flow diagram illustrating a method for estimating a horizon line in a plurality of video frames using a RANSAC algorithm according to some embodiments of the disclosure.

In step 1102, the method initializes a first random number (s) based on the number of forward VPs. In the illustrated embodiment, the method further initializes a total inlier count to zero. In one embodiment, the forward VPs comprise the VPs generated via the cross product, as described previously. In the illustrated embodiment, the number of forward VPs comprises a sum of all forward VPs found in each frame.

In step 1104, the method initializes a second random number (t) based on the number of lateral VPs. In one embodiment, the lateral VPs comprise the VPs identified via cross-ratios as described previously. In the illustrated embodiment, the number of lateral VPs comprises a sum of all lateral VPs found in each frame.

In both steps 1102 and 1104, the random number may be between one and the number of identified VPs, inclusive.

In step 1106, the method fits a line ($l_h$) based on a randomly selected lateral and forward VP. In one embodiment, the values of s and t are used to select a random tuple of a lateral and forward VP. Next, a straight line is fit based on these two points.

In step 1108, the method then checks to see if the fitted line ($l_h$) is within threshold to get the total number of inliers. In one embodiment, the method determines the inliers of the fitted line ($l_h$) by computing the distance of the line ($l_h$) from all the lateral and forward VPs. All VPs below a threshold are called the inliers of this line ($l_h$).

In step 1108, the method adds the forward and lateral VPs to an inlier set representing the horizon line. The method keeps a record of the maximum sum of inliers between all iterations.

In step 1110, the method compares the number of recorded inliers in the inlier set to the total inlier count initialized in step 1102. If the number of recorded inliers is greater than the current total number of inliers, the method adds the number of recorded inliers to the total inlier count (step 1114). If the number of recorded inlier is less than the total inlier count, the method proceeds to step 1112.

In step 1112, the method determines if more iterations are necessary or if the maximum number of inliers was obtained. In one embodiment, the method first determines if the number of iterations is greater than then a maximum number allowed. If so, the method terminates and fits a horizon line on the maximum number of inliers across all iterations. If not, the method additionally determines if the number of inliers determined in steps 1106, 1108, 1110, and 1114 is equal to or greater than a maximum number of desired inliers. In this second check, the method prevents excessive iterations when a system-defined maximum is accumulated.

At the conclusion of the method in FIG. 11, the method generates a set of points that represent the estimated horizon.

Returning to FIG. 5, this horizon may be used in downstream steps 504 through 508.

In one embodiment, the lane detector outputs markers for five (5) lines, which include four (4) vertically positioned lines corresponding to lane boundaries and a fifth horizontal line for the horizon. Hence for the horizon, a best fit line includes a minimum number of "inlier" horizon markers or vanishing points (i.e., 25% of total number of markers). As used herein, inlier markers are those having vertical distance of under a fixed number (e.g., ten) pixels to the best first-degree line fit through a random sample consensus (RANSAC) algorithm.

In step 504, the method computes the IPM for a camera and rectifies the sample images.

After estimating horizon, the method computes a plane normal n using camera intrinsic matrix K and horizon $l_h$ by:

$$\hat{n} = K^T l_h \quad \text{(Equation 1)}$$

where $K^T$ comprises the transpose of the intrinsic camera matrix. In one embodiment, the intrinsic camera matrix comprises the geometric properties of the camera. For example, the matrix K may be of the form:

$$K = \begin{pmatrix} f_x & s & x_0 \\ 0 & f_y & y_0 \\ 0 & 0 & 1 \end{pmatrix} \quad \text{(Equation 2)}$$

where ($f_x$, $f_y$) comprise the focal length of the camera, ($x_0$, $y_0$) represents the principal point offset, and s comprises the axis skew. Other properties may be present in the matrix K and the foregoing example is not limiting.

After computing the plane normal ($\hat{n}$), the method computes the IPM (H) using:

$$H = KRK^{-1} \quad \text{(Equation 3)}$$

where H is the rectification homography which will rotate the camera view to align its Z-axis with the road plan normal, and R is the rotation matrix defined by:

$$R = [l_h \times \hat{n}; (l_h \times \hat{n}) \times -\hat{n}; -\hat{n}] \quad \text{(Equation 4)}$$

In some embodiments, estimation of the horizon and IPM on a short video clip may complete the initialization of camera. In some embodiments, the method may then further rectify the sample frames into a bird's eye view by applying the IPM to the frames. While the camera matrix does not change, or the camera pose does not change, re-initialization is not required. Therefore, in some embodiments, the method depicted in FIG. 5 may comprise a one-off calculation for every camera setting.

In some embodiments, the method of FIG. 5 may further include step 508 wherein lane widths (in pixels) of lanes in the video frames are calculated.

In one embodiment, a frame in the video frames is considered an inlier frame if it has at least one forward and one lateral VP. A pair of consecutive parallel lines can be selected and the distance between the lines is calculated by:

$$L_{W_p} = \frac{\sum_f \frac{|c_2 - c_1|}{\sqrt{a^2 + b^2}}}{f}. \quad \text{(Equation 5)}$$

where parallel lines are be represented as $$a_1 x + b_1 y + c_1 = 0, a_2 x + b_2 y + c_2 = 0 \quad \text{(Equation 16)}$$

where the coefficients $a_1 = a_2$ and $b_1 = b_2$ and only the intercept $c_1$ and $c_2$ are different, and (for Equation 5), f is the number of inlier frames and $L_{W_p}$ is the average initialized lane width in pixels.

In one embodiment, after a minimum number of inlier points constraint is satisfied above, parallel lines are fitted to the inlier markers using least squares by solving Ax=0. In this scenario, A contains the inlier points (subscript) for each parallel line (superscript) in the rectified view. This system is solved using singular value decomposition for the least singular value.

In operation, standard lane widths typically vary across countries and are usually decided by state or federal departments of transportation in the USA. Lane widths are commonly narrower on low volume roads and wider on higher volume roads and depend on the assumed maximum vehicle width. For example, the interstate highway standards for the U.S. Interstate Highway System use a 3.7-meter standard lane width, while in Europe, the minimum widths of lanes are generally between 2.5 to 3.25 meters. Hence, the ratios of these lane widths vary within nearly 0.7 to 1.3. Therefore, an empirically selected threshold on lane width ratio (initialized/detected) $L_{W_R} = 0.3$ may be sufficient in most jurisdictions.

In step 510, the method stores the IPM (H) and the lane width ($L_{W_p}$). In one embodiment, the value of H and lane width are stored in a non-volatile storage device and are associated with a camera. Thus, the value of H and lane width may be reused during subsequent operations performed on images captured by a given camera, as discussed more fully in step 210 and FIG. 6. In some embodiments, the method in FIG. 5 may be executed directly on the camera and stored on the camera (such as on the edge hardware onboard the vehicle). In other embodiments, the value of H, lane width and camera height may be calculated off-camera and stored off-camera (such as in the cloud and stored in a cloud database).

Figure 6:
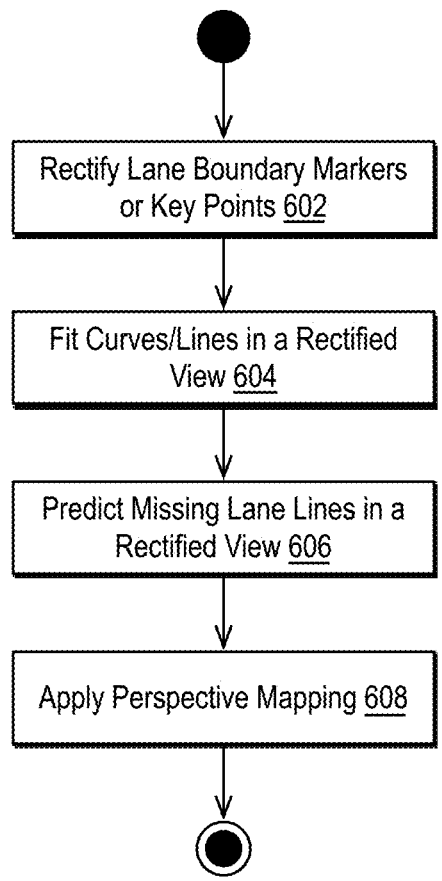
FIG. 6 is a flow diagram illustrating a method for detecting a roadway lane in an image captured by a camera onboard a vehicle according to some embodiments of the disclosure.

Returning to FIG. 2, if the method determines that the camera is initialized, the method proceeds to apply the IPM to line or curves represented by the CNN-predicted markers. As illustrated, in some embodiments, the method may execute step 210 on the sample frames used to initialize the camera in step 208 as well. Reference is made to FIG. 6 for further detail on the operations of step 210.

FIG. 6 is a flow diagram illustrating a method for detecting a roadway lane in an image captured by a camera onboard a vehicle according to some embodiments of the disclosure.

In step 602, the method rectifies lane boundary markers or key points. In one embodiment, the lane boundaries comprise the lane markers generated by the CNN as described more fully in the preceding description. In one embodiment, the method rectifies the CNN output by using the rectification homography (H) generated in the method of FIG. 5.

In step 604, the method fits curves or lines to the rectified lane boundary markers, that is, the method fits curves or lines in a rectified view. In one embodiment, the method fits second degree quadratic curves to a randomly selected subset of the lane boundary markers. Next, a plurality of constraints is imposed on the curves in order to ensure correctness. In one embodiment, three constraints are applied to the. First, the number of inliers is inspected to confirm there are more than a minimum number (e.g., 25% of the total number of markers for lines and 50% for curves). In one embodiment, the perpendicular distance between the curve and a given marker is used as a measure. This process is repeated until the number of inliers cross a threshold or maximum iterations are reached. If it fails, then straight lines are tried.

After line/curve fitting, the second and the third constraints, parallelism and equidistant nature of lane lines, are checked. If the two lines are straight, the parallelism is estimated from the difference between their slopes and the distance between them is computed using the Equation 5. In the case of curved lane boundaries, the difference between the slopes of their tangents is used to determine parallelism and the lane width is calculated by intersecting a line perpendicular to the tangent of first curve to a point at the second curve and then finding the distance between the two points.

Figure 7:
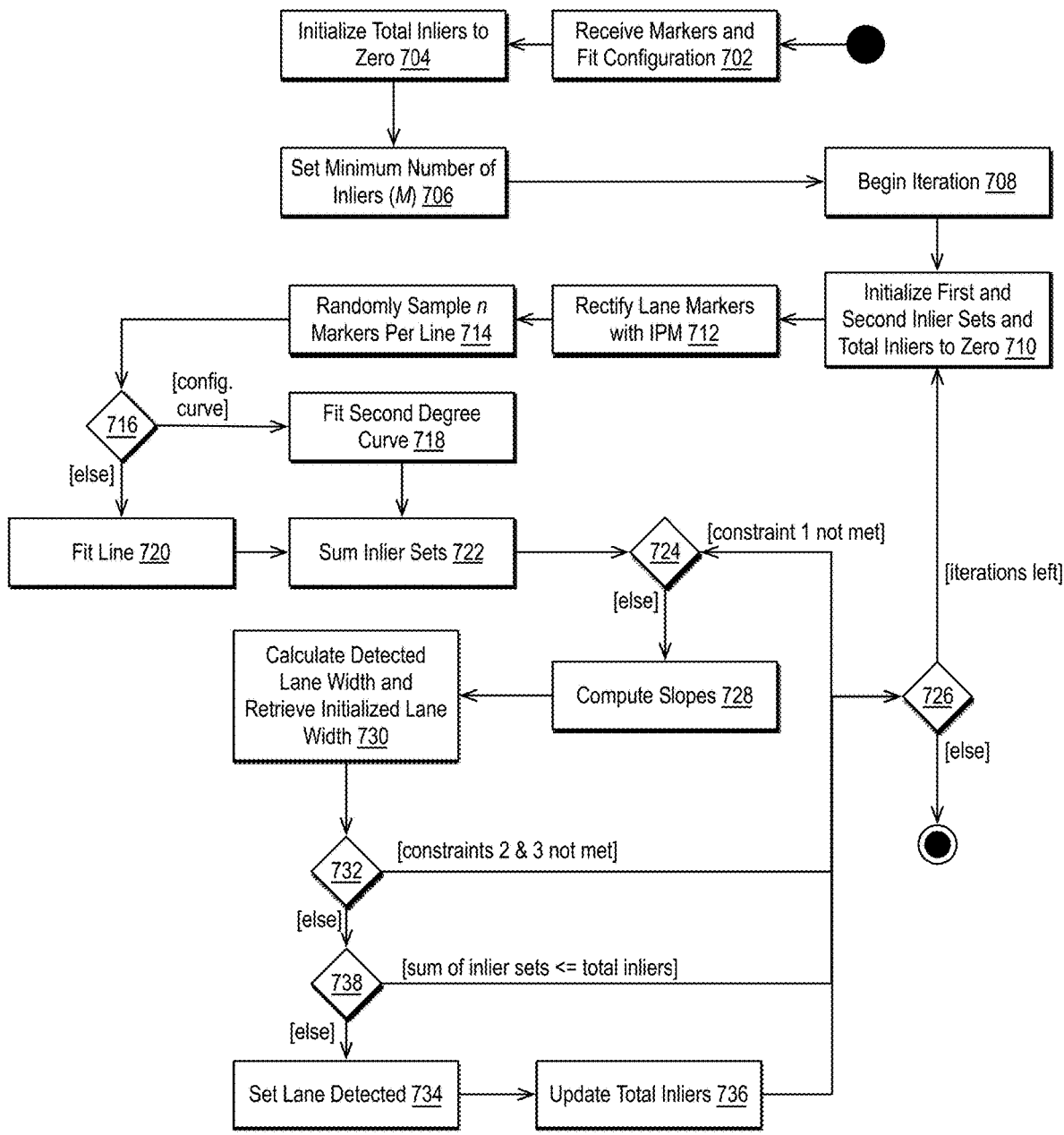
FIG. 7 is a flow diagram depicting an exemplary method for detecting lane boundaries (lines) according to some embodiments of the disclosure.

FIG. 7 is a flow diagram depicting an exemplary method for detecting lane boundaries that implements the above steps 602 and 604 according to some embodiments.

In the illustrated embodiment, steps 702 through 706 comprise an initialization phase of the method. In step 702, the method receives a plurality of lane boundary markers and a fit configuration parameter. In one embodiment, the markers comprise the about of the CNN described previously and the fit configuration comprises a Boolean value. In step 704, the method initializes a total inliers value to zero. In one embodiment. In step 706, the method sets a minimum number of inliers (M). In one embodiment, the value of M may be tuned by the system operator and is used in the computation of the first constraint.

In step 708, the method begins an iteration. In one embodiment, the method starts at zero and iterates MAX_ITER number of times, where MAX_ITER comprises a fixed number of iterations. The value of MAX_ITER may be tuned by the system operator.

In the illustrated embodiment, steps 710 through 722 comprise an iteration initialization phase. In step 710, the method initializes two sets of inliers to zero and a set of total inliers to zero. In the illustrated embodiment, a set of inliers is configured for only two lane boundaries. In other embodiments, the number of sets is proportionate to the desired number of lane boundaries. Two lane boundaries are used in the following description for exemplary purposes. These two sets operate as inlier counters for each iteration. In step 712, the method rectifies the lane markers using the IPM. In step 714, the method randomly samples n markers per line in the lane markers. Next, in step 716, the method determines if the fit configuration parameter indicates that curved or straight lines should be fit. In one embodiment, this parameter may be output by the CNN or may be set manually. If the configuration parameter is set to curved lines (e.g., Boolean true), in step 718, the method fits a second-degree curve to the randomly sampled markers. Alternatively, if the fit configuration parameter is set to straight line fitting (e.g., Boolean false), in step 720 the method fits a straight line to the markers. In step 722, the method counts the number of inliers both sets. If more than two sets are used, each set is counted.

In the illustrated embodiment, steps 724 through 736 comprise the constraint checking phase which determine whether a lane is detected. In step 724, the method determines if the first constraint is met. In one embodiment, the method determines if the counts associated with the sets of all inliers exceed the minimum number of inliers (M) required to proceed. If not, the method immediately proceeds to step 726 whereby the method determines if there are more iterations to execute. If so, the method returns to step 710 and repeats. If not, the method ends.

If the method determines that the inlier sets satisfy the first constraint, in step 728 the method computes slopes for each inlier set. For each, set:

$$m_n = \left| \frac{a_n}{b_n} \right| \qquad \text{(Equation 6)}$$

where $m_n$ comprises a slope for an n-th inlier set and $a_n$ and $b_n$ are quadratic constants derived from the quadratic formula $a_n x + b_n y + c_n = 0$.

In step 730, the method next calculates a detected lane width value ($L_{W_D}$) for the frame and retrieves initialized lane width value ($L_{W_p}$). In the illustrated embodiment, the value of $L_{W_D}$ is computed for the given frame while the value of $L_{W_p}$ comprises the initialized lane width value described in FIG. 5.

In step 732, the method determines if the second and third constraints are met. In one embodiment, the second constraint comprises determining if the lines are parallel according to:

$$|m_1 - m_2| \leq 0.1 \qquad \text{(Equation 7)}$$

In Equation 7, two lines (1 and 2) are compared to determine if the slopes are within 0.1 of each other, indicating that the slopes (or tangents) are parallel.

In the illustrated embodiment, the third constraint is computed according to the following formula:

$$\left| 1 - \frac{L_{W_D}}{L_{W_p}} \right| \leq L_{W_R} \qquad \text{(Equation 8)}$$

where LWR=0.3

Finally, in step 738, the method may also check, as part of the second and third constraints whether the aggregate number of inliers (computed in step 722) in the current iteration is greater than the total number of inliers detected in the previous iteration (as computed in step 736).

If any of the above constraints are not met, the method immediately proceeds to step 726 whereby the method determines if there are more iterations to execute. If so, the method returns to step 710 and repeats. If not, the method ends.

If, however, the constraints are met, the method sets a flag to indicate a lane was detected in step 734. Next, the method adds the sets of inliers to the total inlier set. Finally, the method proceeds to step 726 whereby the method determines if there are more iterations to execute. If so, the method returns to step 710 and repeats. If not, the method ends.

Returning to FIG. 6, after fitting curves and lines to the markers, the method proceeds to predict any lanes missed during the foregoing processes (step 606).

In order to estimate the missing lanes, the method uses the initialized lane width in pixels ($L_{W_p}$). Specifically, the method may calculate the lane boundary offset for the missing or low confidence lanes from according to the following formula:

$$c_0 = L_{W_p} \sqrt{a^2 + b^2} \qquad \text{(Equation 9)}$$

where co is the required offset in x-intercept for the missing lines. Adding co to the x-intercept of the detected lane boundaries in the rectified view, the method may predict the missing lane boundaries. For example, for a detected first lane's first boundary, the method may predict the number of missing lane boundaries on each side according to the following formula:

$$x = -\frac{b}{a}y + (c \pm c_0) \quad \text{(Equation 10)}$$

After the missing lane boundary prediction, the method may perform a reciprocal weighted average of the lanes 'x-coordinates near the forward VP and bottom of the image. For example, if there are two predicted boundaries on the right side of an initial lane boundary, the method weighted averages may be computed according to the following formula:

$$x'_1 = \frac{(w'x_1 + wx'_1)}{w + w'}, x'_2 = \frac{(w'x_2 + wx'_2)}{w + w'} \quad \text{(Equation 17)}$$

where the weights w, w', w" are {0, 1, 2} respectively and are selected, based on the distance of the predicted lane boundary from detected lane boundary. Detected lane boundary is given a weight of 0, predicted lane boundary that is one lane width distance away is assigned a weight of 1, and so on. This enables robust retrieval of missing lane boundaries.

In step 608, the method applies perspective mapping via an inverse transformation to the detected lane boundaries using the inverse of the rectification homography (i.e., $H^{-1}$). The result of this transformation is a plurality of lines in a perspective view.

Finally, returning to FIG. 2, the method transmits or outputs the perspective lane boundaries in step 212. In one embodiment, the method may transmit the line/curve data to a downstream processing device for further processing. For example, the method may transmit the data to a lane warning system to enable the system to determine if the vehicle crosses a lane boundary. In other embodiments, the outputting of the line/curve comprises displaying the line/curve on an in-vehicle display (e.g., a dash-mounted display or mobile phone). In one embodiment, the lane boundaries may be overlaid on top of the capture video frames.

As illustrated above, a single view camera and its geometry may be used to improve lane detection. Further, some of disclosed embodiments provide for methods, devices, and computer-readable media for calculating the distance to objects based on the same single view camera. These embodiments are described in more detail herein.

Figure 8:
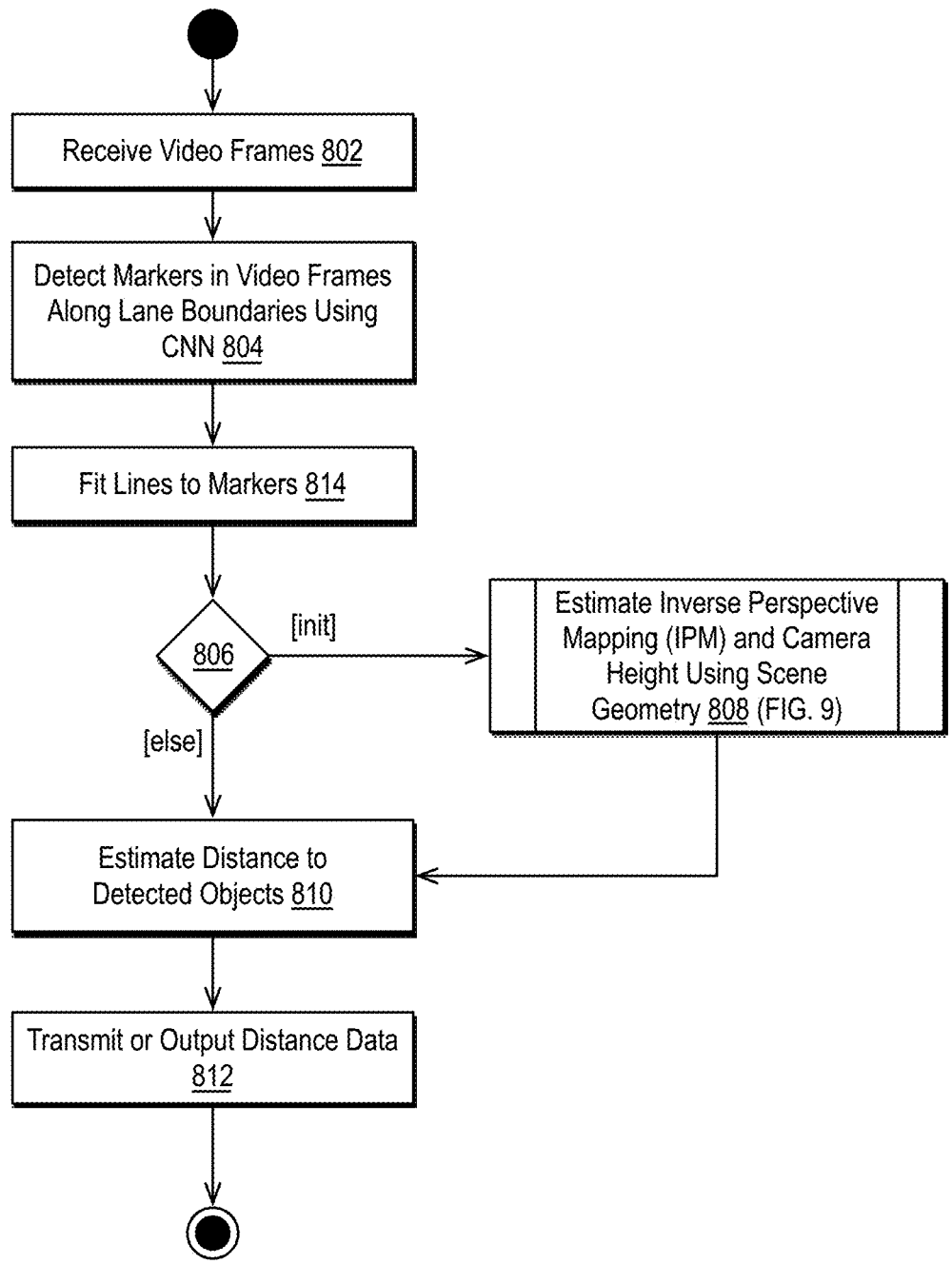
FIG. 8 is a flow diagram illustrating a method for estimating the distance of objects in video frames according to some embodiments of the disclosure.

FIG. 8 is a flow diagram illustrating a method for estimating the distance of objects in video frames according to some embodiments of the disclosure.

In step 802, the method receives video frames. In one embodiment, the video frames are captured by a camera installed on a vehicle. In one embodiment, the camera is mounted at a fixed location and direction with respect to the vehicle. For example, the camera may be a dash-mounted camera. In the illustrated embodiment, the camera continuously streams video frames while in operation.

In step 804, the method detects markers (or key points) in video frames using a CNN. Next, in step 814, the method fits one or more lines to the markers. Reference is made to FIG. 3 which depicts one embodiment of a CNN according to some embodiments of the disclosure. The description of FIG. 3 is incorporated herein by reference in its entirety.

In step 806, the method determines if the system is initializing a camera. If so, the method proceeds to step 808. If not, the method proceeds to step 810. In one embodiment, the method determines that the system is initializing if a road plane normal or camera height has not previously been stored for the camera. In one embodiment, the estimation of the road plane normal or camera height is a one-off calculation for a given camera which is done over a small set of initial frames. Thus, each camera can be associated with a road plane normal or camera height and the road plane normal or camera height need only be calibrated once per camera. In some embodiments, the road plane normal or camera height may be recalculated as desired or in response to a change in camera position or other intrinsic value.

In step 808, the method estimates the IPM and camera height using scene geometry of the camera and frames recorded by the camera.

Figure 4B:
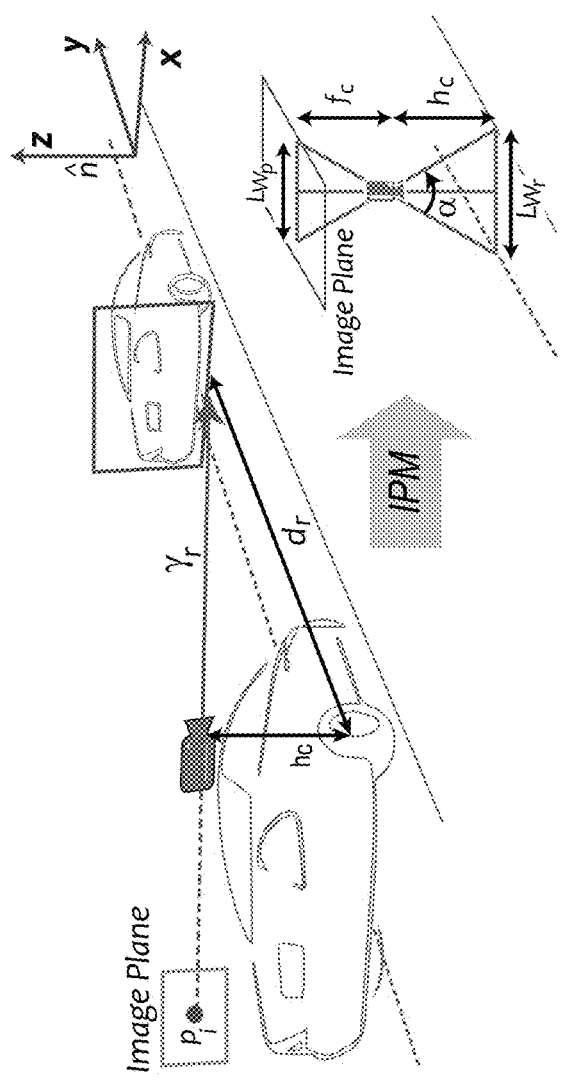

In one embodiment, camera initialization involves using camera intrinsic values and road geometry to find an IPM to synthetically rotate the viewpoint of the video frames and lane width to fit equidistant parallel lanes in rectified view after the initialization. The step further includes determining a height of the camera based on the geometry. In the illustrated embodiment, the estimation of the IPM is performed using a right-handed frame of reference. This geometry is depicted in FIGS. 4A and 4B. Further details of step 808 are provided in the description of FIG. 9 herein.

Figure 9:
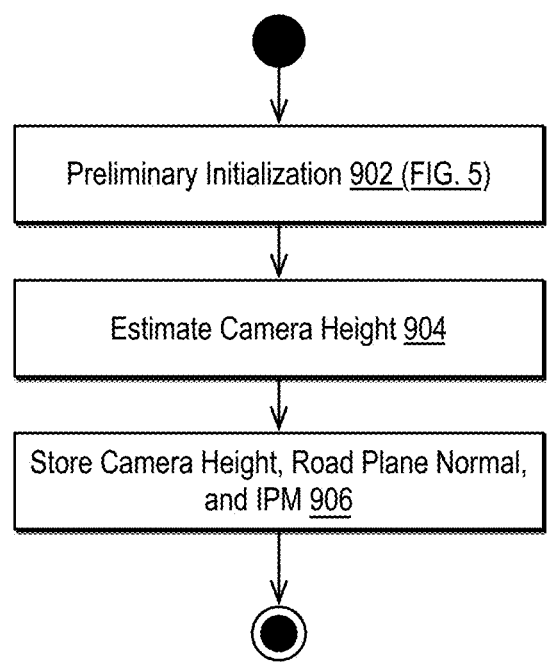
FIG. 9 is a flow diagram illustrating a method for initializing a camera installed in a vehicle according to some embodiments of the disclosure.

FIG. 9 is a flow diagram illustrating a method for initializing a camera installed in a vehicle according to some embodiments of the disclosure. As described above, the method in FIG. 9 may only need to be performed once per camera or only on demand.

In step 902, the method performs a preliminary initialization. In the illustrated embodiment, step 902 may include all of the embodiments described with respect to steps 502, 504, and 506 and that disclosure is not repeated herein. Indeed, in some scenarios the method of FIG. 5 may be used to predict only lane widths. However, the method of FIG. 9 may be used to predict object distances only or both object distances and lane widths.

In step 904, the method computes uses from the frames and rectifies the frames. Details of step 904 may incorporate the processes described in the description of step 504, and those steps are not repeated herein but are incorporated by reference in their entirety.

In step 904, the method computes an estimated camera height ($h_c$).

After calculating the value of $L_{W_p}$, in some embodiments, the method uses the camera focal length ($f_c$) to compute a viewing angle α as follows:

$$\alpha = 2 \times \tan^{-1}\left(\frac{L_{W_p}/2}{f_c}\right) \quad \text{(Equation 11)}$$

Once camera viewing angle α is known, the method may compute the camera height $h_c$ as follows:

$$h_c = \frac{\frac{L_{W_c}}{2}}{\tan\left(\frac{\alpha}{2}\right)} \quad \text{(Equation 12)}$$

where $L_{W_r}$ is the lane width in the real world. Considering that lane widths are usually standard across highways, in some embodiments, $L_{W_r}$ may be a fixed or known constant.

In step 906, the method stores the computed camera height ($h_c$), road plane normal ($\hat{n}$), and the IPM. In one embodiment, the computed camera height and road plane normal are stored in a non-volatile storage device and are associated with a camera. Thus, the computed camera height and road plane normal may be reused during subsequent operations performed on images captured by a given camera, as discussed more fully in step 810 and FIG. 12. In some embodiments, the method in FIG. 9 may be executed directly on the camera and stored on the camera. In other embodiments, the computed camera height and road plane normal may be calculated off-camera and stored off-camera.

Returning to FIG. 8, if the method determines that the camera is initialized the method proceeds to estimate the distance to identified objects in step 810. As illustrated, in some embodiments, the method may execute step 810 on the sample frames used to initialize the camera in step 808 as well. In the illustrated embodiment, any type of object detection system may be used to identify objects (e.g., via bounding boxes) within an image including detecting objects using DL object detectors such as Faster-RCNN, MobileNet-SSD, EfficientDets, YoloV1, 2, 3, 4, 5, and similar such systems.

In the illustrated embodiment, once the camera is initialized (step 808), the camera height ($h_c$) and road plane normal ($\hat{n}$) are known. The method then reconstructs the road plane according to:

$$\pi_r = \begin{bmatrix} \hat{n} \\ -h_c \end{bmatrix} \quad \text{(Equation 13)}$$

where $\pi_r$ is the 4×1 reconstructed road plane vector.

In the illustrated embodiment, a ray from the point pi in the image plane of the camera is given by $\gamma_r = K^{-1} p_i$. Thus, the distance from the image plane to point where this ray intersects the reconstructed road plane in the real-world can be found by solving:

$$\pi_r^T \begin{bmatrix} d_r \gamma_r \\ 1 \end{bmatrix} = 0$$

where $d_r$ is the distance where $\gamma_r$ intersects the plane:

$$d_r = \frac{h_c}{\hat{n} \cdot \gamma_r} \quad \text{(Equation 15)}$$

This intersection is depicted in FIG. 4B.

Finally, in step 812, the method transmits or outputs the distance data. In one embodiment, the distance data includes distances to detected objects. In some embodiments, the distance data includes bounding boxes for the detected objects. In some embodiments, the method may further detect lane boundary or lane lines/curves (using the methods described in connection with FIGS. 2 through 7) and may include these in the returned data. In one embodiment, the method may transmit the line/curve data to a downstream processing device for further processing. For example, the method may transmit the data to a collision detection system to enable the system to determine if the vehicle is too close to another object or vehicle.

Figure 12:
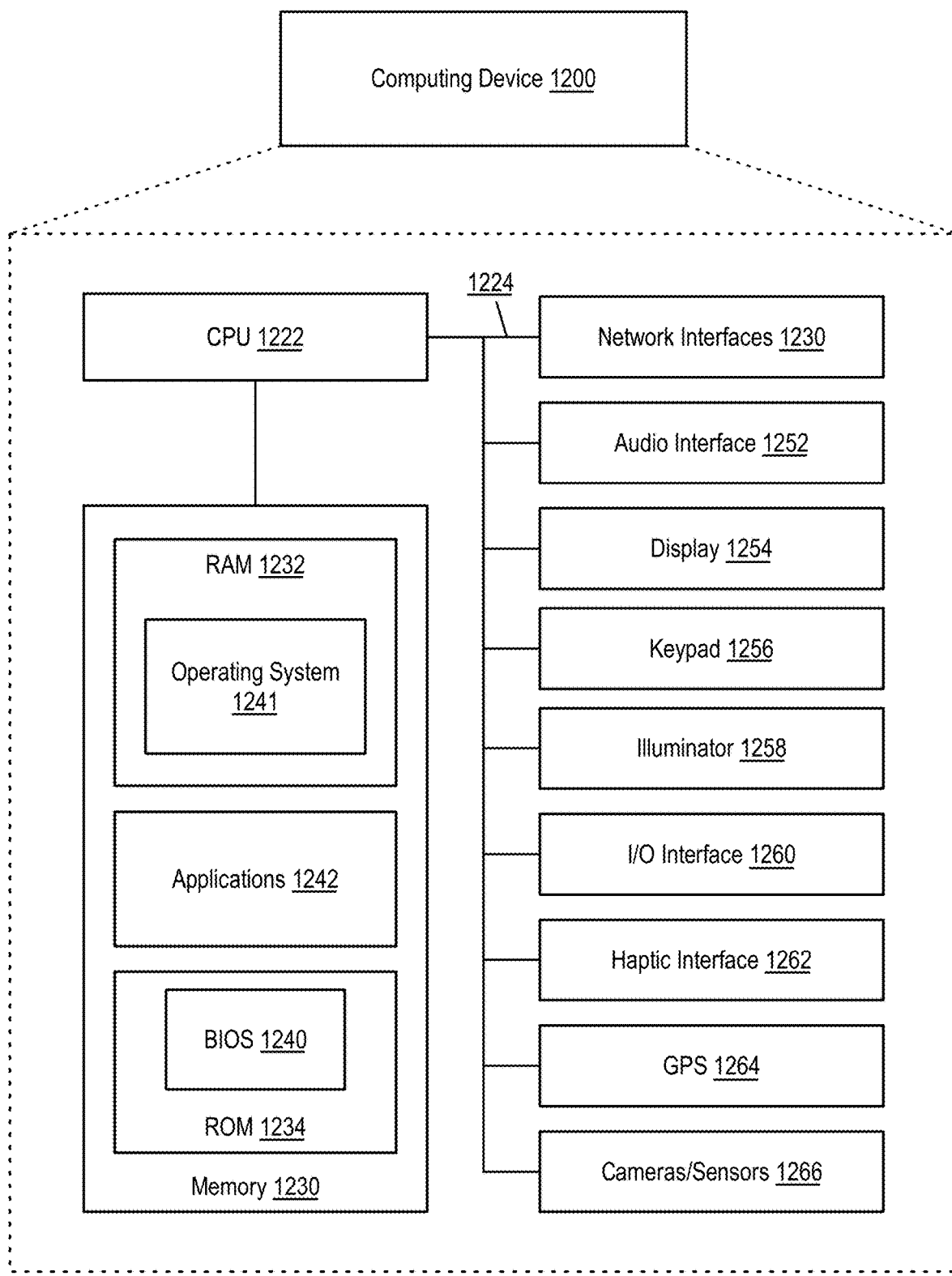
FIG. 12 is a block diagram illustrating a computing device showing an example embodiment of a computing device used in the various embodiments of the disclosure.

FIG. 12 is a block diagram illustrating a computing device showing an example embodiment of a computing device used in the various embodiments of the disclosure. The computing device 1200 may include more or fewer components than those shown in FIG. 12. For example, a server computing device may not include audio interfaces, displays, keypads, illuminators, haptic interfaces, GPS receivers, cameras, or sensors.

As shown in the figure, the device 1200 includes a processing unit (CPU) 1222 in communication with a mass memory 1230 via a bus 1224. The computing device 1200 also includes one or more network interfaces 1250, an audio interface 1252, a display 1254, a keypad 1256, an illuminator 1258, an input/output interface 1260, a haptic interface 1262, an optional global positioning systems (GPS) receiver 1264 and a camera(s) or other optical, thermal, or electromagnetic sensors 1266. Device 1200 can include one camera/sensor 1266, or a plurality of cameras/sensors 1266, as understood by those of skill in the art. The positioning of the camera(s)/sensor(s) 1266 on the device 1200 can change per device 1200 model, per device 1200 capabilities, and the like, or some combination thereof.

The computing device 1200 may optionally communicate with a base station (not shown), or directly with another computing device. Network interface 1250 is sometimes known as a transceiver, transceiving device, or network interface card (NIC).

The audio interface 1252 produces and receives audio signals such as the sound of a human voice. For example, the audio interface 1252 may be coupled to a speaker and microphone (not shown) to enable telecommunication with others or generate an audio acknowledgment for some action. Display 1254 may be a liquid crystal display (LCD), gas plasma, light-emitting diode (LED), or any other type of display used with a computing device. Display 1254 may also include a touch-sensitive screen arranged to receive input from an object such as a stylus or a digit from a human hand.

Keypad 1256 may comprise any input device arranged to receive input from a user. Illuminator 1258 may provide a status indication or provide light.

The computing device 1200 also comprises input/output interface 1260 for communicating with external devices, using communication technologies, such as USB, infrared, Bluetooth®, or the like. The haptic interface 1262 provides tactile feedback to a user of the client device.

Optional GPS receiver 1264 can determine the physical coordinates of the computing device 1200 on the surface of the Earth, which typically outputs a location as latitude and longitude values. GPS receiver 1264 can also employ other geo-positioning mechanisms, including, but not limited to, triangulation, assisted GPS (AGPS), E-OTD, CI, SAT, ETA, BSS, or the like, to further determine the physical location of the computing device 1200 on the surface of the Earth. In one embodiment, however, the computing device 1200 may through other components, provide other information that may be employed to determine a physical location of the device, including, for example, a MAC address, Internet Protocol (IP) address, or the like.

Mass memory 1230 includes a RAM 1232, a ROM 1234, and other storage means. Mass memory 1230 illustrates another example of computer storage media for storage of information such as computer-readable instructions, data structures, program modules, or other data. Mass memory 1230 stores a basic input/output system ("BIOS") 1240 for controlling the low-level operation of the computing device 1200. The mass memory also stores an operating system 1241 for controlling the operation of the computing device 1200

Applications 1242 may include computer-executable instructions which, when executed by the computing device 1200, perform any of the methods (or portions of the methods) described previously in the description of the preceding Figures. In some embodiments, the software or programs implementing the method embodiments can be read from hard disk drive (not illustrated) and temporarily stored in RAM 1232 by CPU 1222. CPU 1222 may then read the software or data from RAM 1232, process them, and store them to RAM 1232 again. In one embodiment, the mass memory 1230 comprises a non-transitory computer-readable storage medium and the applications 1242 comprise computer program instructions, or program logic, capable of being executed by a CPU 22 or other suitable computer processor.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "$a_n$," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving a sample set of image frames;
   detecting a plurality of markers in the sample set of image frames using a convolutional neural network (CNN);
   fitting lines based on the plurality of markers;
   detecting a plurality of vanishing points based on the lines;
   performing a random sample consensus (RANSAC) algorithm on the plurality of vanishing points to identify a best fitting horizon for the sample set of image frames;
   computing an inverse perspective mapping (IPM) based on the best fitting horizon; and
   computing a lane width estimate based on the sample set of image frames using the IPM in a rectified view and the line fitting.

2. The method of claim 1, wherein detecting a plurality of markers comprises detecting, using a convolutional neural network (CNN), a plurality of markers situated along a lane boundary of a roadway included in the sample set of image frames.

3. The method of claim 1, wherein computing the IPM comprises computing a rectification homography based on an intrinsic matrix of a camera used to capture the sample set of image frames and a rotation matrix, the rotation matrix calculated based on the best fitting horizon and a road plane normal.

4. The method of claim 1, further comprising rectifying the sample set of image frames using the IPM to generate a rectified view.

5. The method of claim 1, further comprising computing a height of a camera that captured the sample set of image frames based on a known lane width in real world.

6. The method of claim 1, further comprising receiving a second set of frames and detecting a plurality of lanes in the second set of frames using the IPM.

7. The method of claim 6, wherein detecting a plurality of lane lines in the second set of frames using the IPM comprises:
   rectifying markers detected in the second set of frames using the IPM; and
   fitting a plurality of lines to the rectified markers.

8. The method of claim 7, further comprising predicting at least one missing lane boundary in the rectified view.

9. The method of claim 1, further comprising perspectively transforming points associated with the lines using an inverse of the IPM.

10. The method of claim 9, further comprising:
    detecting an object in the sample set of image frames; and
    calculating a distance from a camera to the object based on a camera height and a normal plane.

11. A non-transitory computer-readable storage medium for tangibly storing computer program instructions capable of being executed by a computer processor, the computer program instructions defining the steps of:
    receiving a sample set of image frames;
    detecting a plurality of markers in the sample set of image frames using a convolutional neural network (CNN);
    fitting lines based on the plurality of markers;
    detecting a plurality of vanishing points based on the lines;
    performing a random sample consensus (RANSAC) algorithm on the plurality of vanishing points to identify a best fitting horizon for the sample set of image frames;
    computing an inverse perspective mapping (IPM) based on the best fitting horizon; and
    computing a lane width estimate based on the sample set of image frames using the IPM in a rectified view and the line fitting.

12. The non-transitory computer-readable storage medium of claim 11, wherein detecting a plurality of markers comprises detecting, using a convolutional neural network (CNN), a plurality of markers situated along a lane boundary of a roadway included in the sample set of image frames.

13. The non-transitory computer-readable storage medium of claim 11, wherein computing the IPM comprises computing a rectification homography based on an intrinsic matrix of a camera used to capture the sample set of image frames and a rotation matrix, the rotation matrix calculated based on the best fitting horizon and a road plane normal.

14. The non-transitory computer-readable storage medium of claim 10, the steps further defining the step of computing a height of a camera that captured the sample set of image frames based on a known lane width.

15. The non-transitory computer-readable storage medium of claim 10, the steps further defining the step of receiving a second set of frames and detecting a plurality of lanes in the second set of frames using the IPM.

16. The non-transitory computer-readable storage medium of claim 15, wherein detecting a plurality of lane lines in the second set of frames using the IPM comprises:
    rectifying markers detected in the second set of frames using the IPM; and
    fitting a plurality of lines to the rectified markers.

17. The non-transitory computer-readable storage medium of claim 16, the steps further defining the step of predicting at least one missing lane boundary in the rectified view.

18. The non-transitory computer-readable storage medium of claim 17, wherein the steps further defining the steps of:
  detecting an object in the sample set of image frames; and
  calculating a distance from a camera to the object based on a camera height and a normal plane.

19. A device comprising:
  a processor; and
  a storage medium for tangibly storing thereon program logic for execution by the processor for performing steps of:
    receiving a sample set of image frames;
    detecting a plurality of markers in the sample set of image frames using a convolutional neural network (CNN);
    fitting lines based on the plurality of markers;
    detecting a plurality of vanishing points based on the lines;
    performing a random sample consensus (RANSAC) algorithm on the plurality of vanishing points to identify a best fitting horizon for the sample set of image frames;
    computing an inverse perspective mapping (IPM) based on the best fitting horizon; and
    computing a lane width estimate based on the sample set of image frames using the IPM in a rectified view and the line fitting.

20. The device of claim 19, the program logic further defining a step of receiving a second set of frames and detecting a plurality of lane lines in the second set of frames using the IPM.

* * * * *